Feb. 17, 1931. R. W. SNYDER 1,792,775
UNIT METHOD OF BUILDING TIRES
Filed April 28, 1928 2 Sheets-Sheet 1
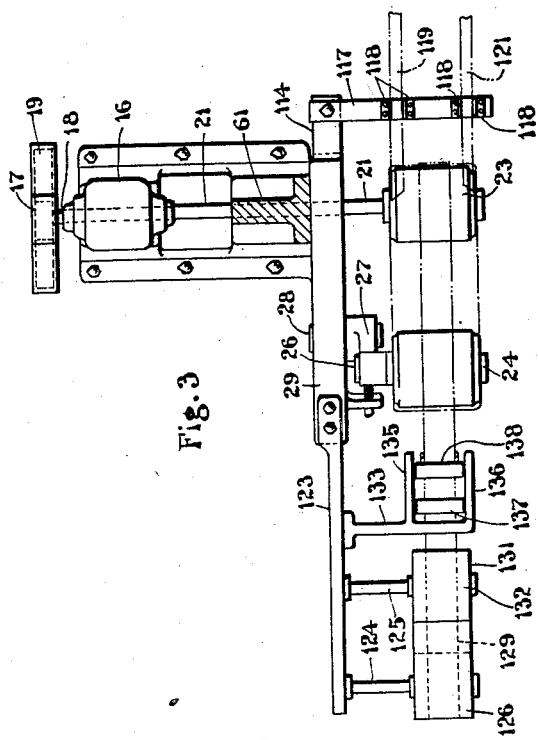
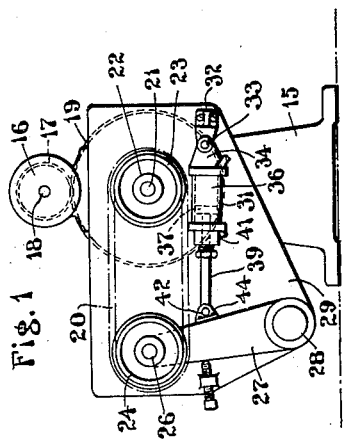
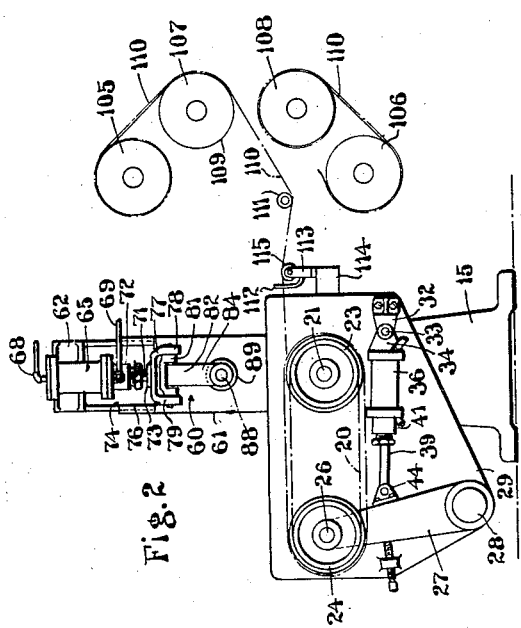
Inventor
Robert W. Snyder
By
Attorney Feb. 17, 1931.  R. W. SNYDER  1,792,775
UNIT METHOD OF BUILDING TIRES
Filed April 28, 1928   2 Sheets-Sheet 2
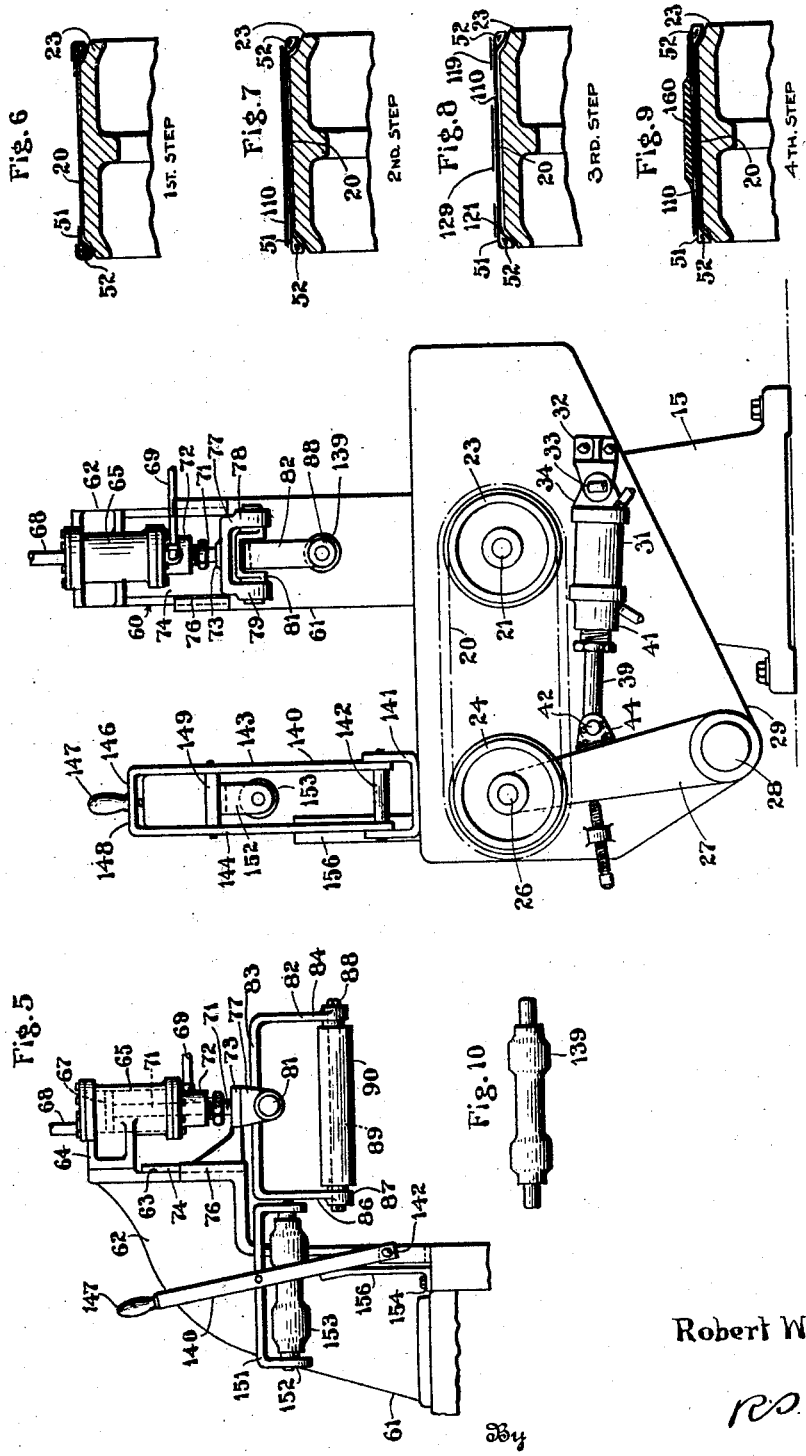
Inventor
Robert W. Snyder Patented Feb. 17, 1931

1,792,775

UNITED STATES PATENT OFFICE

ROBERT W. SNYDER, OF AKRON, OHIO, ASSIGNOR TO THE GOODYEAR TIRE & RUBBER COMPANY, OF AKRON, OHIO, A CORPORATION OF OHIO

UNIT METHOD OF BUILDING TIRES

Application filed April 28, 1928. Serial No. 273,716.

This invention relates to the fabrication of pneumatic tires and it has particular relation to a method for assembling the various elements of which such tires are composed, into cylindrical bands which may then be shaped to form tires of conventional contour.

One object of the invention is to provide a method for the assembly of tires in which the amount of mechanical equipment required is reduced to a minimum.

Another object of the invention is to provide a method for fabricating tires in which the various operations required for the assembly of the different units are distributed among a considerable number of operators, thereby making possible the division of labor among a relatively large number of workmen, with a resulting simplification of the operations required of each one.

One method of assembling the various units of which a pneumatic tire is composed involves the use of a cylindrical drum having a peripheral diameter approximately the same as the inner diameter of the beads of the tire which is being manufactured thereon. In practicing this method of manufacture, all of the tire elements are assembled upon a single drum. This necessitates that each tire building machine be equipped with a complete assortment of instrumentalities for the application of the various elements of the tires to the tire carcass. For example, each machine is equipped with suitable devices for stitching together the various elements; also, with bead setting devices and suitable guides for the application of the various plies of fabric and the tread element. Since each of these devices is relatively complicated in construction, considerable expense is entailed in equipping all of the tire machines that are employed in a pneumatic tire factory.

Furthermore, it is necessary that each operator perform all of the steps involved in assembling a tire band. Much time is, therefore, lost in changing from one device upon a tire machine to another. A high degree of specialization in labor is, therefore, impossible.

In accordance with the method embraced by the principles of this invention, the cylindrical blanks or bands from which the tires are shaped are built up or assembled upon machines provided with pairs of drums of such diameter that both drums readily pass within the inner periphery of the beads of a tire. One of these drums may easily be provided with means for imparting rotational movement thereto, and the other thereof may be made shiftable with respect to the first mentioned drum, so that the distance between the drums may be increased or decreased, in order to facilitate the application of a tire band. A number of units of this character may be employed for the construction of a single tire, each machine being employed for the application of a particular element or a relatively limited number of such elements. It is thus possible to employ machines equipped only with such instrumentalities as are necessary to perform a relatively limited number of the operations on the tires. Also, since an operator has but a limited number of steps to perform in the assembly of a tire band, he quickly becomes highly skillful in his particular task. A considerable saving in mechanical equipment and a great increase in efficiency upon the part of the workmen employed is thus effected.

For a better understanding of the invention, reference may now be had to the accompanying drawings, forming a part of this specification, of which;

Figure 1 is an elevational view of the machine employed in performing the first step involved in the method;

Figure 2 is an elevational view of a machine employed in performing the second step involved in the invention;

Figure 3 is a plan view of a machine employed in performing the third step involved in the invention;

Figure 4 is an elevational view of a machine employed to apply and stitch down the tread element to the tire carcass;

Figure 5 is a fragmentary elevational view showing, on a larger scale and in detail, the mechanism employed for stitching the tread element to a tire carcass;

Figure 6 is a fragmentary cross-sectional view of one of the tire machine drums and a partially assembled tire thereon at the completion of the first step of the method involved in this invention;

Figure 7 is a similar view of the same parts at the completion of the second step involved;

Figure 8 is a view similar to that disclosed in Figure 6, but showing the drum and the tire at the completion of the third step involved;

Figure 9 is a view, similar to that shown in Figure 8, disclosing the drum and the tire band thereon at the completion of the fourth and final step involved in the process; and Figure 10 is an elevational view showing in detail a tread stitching roller.

In practicing the invention, the mechanism disclosed in Figure 1 may be conveniently employed for performing the first step involved in the assembly of a tire band. This mechanism includes a rectangular base 15 having an electric motor 16 attached to the upper portion thereof. A gear 17 is secured to the extremity of the drive shaft 18 of the motor, and engages a gear 19 of relatively large diameter. The latter gear is secured to one extremity of a horizontal drive shaft 21, which projects forwardly through bearings formed in the frame 15 and is keyed at its outer end within a hub 22 of a drum 23.

The drum 23 is of relatively small diameter, and, accordingly, a second drum 24 is provided in parallel relation thereto, the space between the drums being such that a rubberized fabric band 20 may be trained about both simultaneously. The second drum is rotatably mounted upon a stud shaft 26, secured to the extremity of a rocker arm 27, journalled upon a stud shaft 28. The latter member, in turn, is secured to and projects from the face of a relatively large plate 29, which is secured to the forward face of the base 15. In order to actuate the rocker arm 27, and thus increase or slacken the tension upon a tire band 20, a piston actuated mechanism 31 is secured to the forward face of the plate 29, slightly below the drum 23. This mechanism includes a bracket 32, bolted to the face of the plate 29, and having a pintle 33 projecting outwardly therefrom. The latter member functions as a pivot for a bracket 34 secured upon the rear end of a cylinder 36, having suitable conduits (not shown) for conveying fluid under compression connected to opposite ends thereof.

A piston head 37 mounted within the cylinder provides means for the actuation of a piston rod 39 rigidly attached thereto and projecting through a stuffing box 41 that is mounted upon the forward end of the cylinder. In order to secure the piston rod 39 to the rocker arm 27, the projecting extremity of the rod is provided with a transversely extending pintle 42, which is journalled in a bracket 44 secured to the adjacent edge of the rocker arm.

In operating the apparatus just described, the drum 24 is retracted toward the drum 23, and the band 20, constituting one or more inner fabric plies of a tire carcass, is positioned upon the drums. Bead elements 51 (Fig. 6), preferably having inextensible cores 52, are then positioned adjacent the edges of the fabric bands. The edge portions of the fabric are then turned upwardly about the beads, and stitched thereto by means of any convenient tool (not shown) well known to the art. To remove the partially assembled tire carcass from the drums 23 and 24, fluid under compression is admitted into the cylinder 36 to retract the piston 37, and thus operate the arm 27 to retract the drum 24 toward the drum 23. The partially assembled tire band may then be removed without difficulty.

The second operation involved in the process is performed upon the unit disclosed in Figure 2. This machine embodies the base 15 and tire supporting drums 23 and 24 described in connection with Figure 1. In addition, it also includes a stitcher mechanism 60, having an upwardly extending support 61, which is secured to the upper face of the base 15. As shown in Figure 5 of the drawings, the support 61 is provided at its upper extremity with a forwardly extending portion 62, having a vertical face 63. The latter has bolted thereto a bracket 64, integrally formed upon one side of a vertically disposed cylinder 65.

The interior of the cylinder 65 slidably receives a piston head 67, which actuates a stitcher mechanism to be described. In order to operate the piston head, fluid under compression is admitted through conduits 68 and 69 that are connected to opposite ends of the cylinder and lead to a suitable source of compressed fluid (not shown). The piston head 67 is rigidly secured to a downwardly extending piston rod 71 that projects outwardly through a stuffing box 72 secured to the lower end of the cylinder. The lower end of the rod 71 is secured to and is guided by a horizontally extending bracket 73 having a vertically disposed portion 74, which is slidable in a vertical path between guides 76 secured to the forward face 63 of the member 62.

A member 77 of U-shape is rigidly attached to the lower face of the bracket 73, with its center line in substantially vertical relation to the axis of the drum 23. Branches 78 and 79 (Figure 4) of the member provide bearings for a transversely extending member 81, which functions as a pivotal support for a second member 82, also of U-shape, the bight portion 83 of which is rigidly secured to the member 81. The lower extremities of the branches 84 and 86 of the member 82 are provided with journal bearings 87 and 88 for supporting a transversely extending stitcher roller 89 which is preferably covered with yieldable material 90, such as soft rubber, so that the contour thereof will readily adapt itself to slight irregularities in the carcasses of tires.

The machine shown by Figure 2 is also provided with a pair of fabric supply rollers 105 and 106, disposed in spaced parallel relation to the drums 23 and 24. These rollers are respectively equipped with take-up rollers 107 and 108 that serve to receive the liner 109 from a sheet of tire fabric 110.

In order accurately to align the sheet 110 with respect to the center line of a tire carcass disposed upon the drums 23 and 24, the sheet is trained about an idler roller 111 and is directed between vertically disposed guiding fingers 112 that are rigidly secured to upwardly extending portions 113 of a bracket 114 mounted upon the base 15. A horizontally disposed roller 115 mounted upon the portions 113 immediately adjacent the fingers 112 facilitates accurate guiding of the fabric strip 110 to the drums.

To perform the second step involved in the invention, the drum 24 is swung about the shaft 28 to a position adjacent the drum 23, and the partially assembled tire carcass 20, including the inner plies of fabric and the beads which are stitched thereto, is slipped over the outer periphery of both drums 23 and 24. By operating the piston rod 39, the roller 24 is moved away from the roller 23, thus tensioning the tire carcass. The end of the sheet of fabric 110 is next drawn from either the roller 105 or the roller 106, over the roller 114 and between the guide fingers 116, and is placed upon the surface of the partially assembled tire carcass 20. The motor 16 is then operated to rotate the drum 23 and thus wind a ply of fabric upon the tire carcass. When a sufficient length of fabric has been thus wound upon the latter element, the fabric is torn across and the free end is retracted upon the roller 105.

Since the fabric 110 is composed of weftless cord material, or cord fabric having only weak filler threads, which is cut upon a bias, it is necessary, in order to prevent the cords from separating, that a second ply of fabric, having the cords thereof disposed at an angle with respect to the cords of the first ply, be wound upon the tire carcass. This operation is accomplished by having the fabric on the roller 106 so disposed that the cords thereof extend transversely of the cords of the fabric upon the roller 105. A ply of fabric from the roller 106 is then withdrawn and wound upon the surface of the tire carcass over the first ply. In order to stitch the two outer plies of fabric together, and to the outer surfaces of the inner ply of fabric and the beads, fluid is admitted to the upper end of the cylinder 67 to actuate the stitcher mechanism downwardly. The roller 89 engages the surface of the tire fabric with force sufficient to complete the stitching operation. Fluid is admitted to the lower end of the actuating cylinder 65 to cause the stitcher mechanism to return to its initial position and the edge portions of the outer plies of fabric may then be stitched down over the sides of the beads by means of any convenient manually operated tool.

The third operation involved in the practice of the invention is performed upon the mechanism illustrated in Figure 3. This mechanism is similar to that disclosed in Figure 3, with the exception that the supply rollers 105 and 107, together with the guide roller 115, have been omitted. In place thereof, a chafing strip guide, including the bracket 114, is secured to an edge of the plate 29. The bracket functions as a support for an arm 117 extending forwardly in parallel relation to the drum 23. Spaced brackets 118 are secured to the upper side of the latter member in such relation to each other as to form guides for directing chafing strips 119 and 121 to the edge portions of the drum 23.

A supporting arm 123 for a pair of forwardly projecting shafts 124 and 125 projects from the edge of the plate 29, opposite the bracket 114. The shaft 124 is provided with a supply roll 126 for a breaker strip 129, and the shaft 125 with a take-up roller 131, to receive the liner 132 from the breaker strip.

A transversely extending bracket 133 secured to the arm 123 in parallel relation to the shaft 124, is equipped with arms 135 and 136 that extend at right angles to the axes of the drums 23 and 24. These members are also provided with bearings for a pair of rollers 137 and 138 that function as guides for the breaker strip 129 when the latter is being applied to the surface of a tire carcass.

In order to perform the third step involved in the invention, chafing strips 119 and 121 are placed between the guide brackets 118, and the motor 16 is operated to wind the strips upon the surface of the partially completed tire carcass. When this operation is completed, the end of a breaker strip 129 is then drawn forward and stitched manually to the central portion of the carcass, and the motor is then again operated to rotate the drums 23 and 24 in a reverse direction, thereby winding the breaker strip about the tire carcass. When a proper length of breaker strip has been unwound from the roll 126, it is severed by means of a pair of scissors or other convenient instrumentality, and the free end is returned to the stock on the roll 126. The stitcher roller 89 is then actuated to bring it into contact with the surfaces of the breaker strip and the chafing strips, and simultaneously the motor 16 is operated to rotate the drums 23 and 24, thus stitching the chafing strips and the breaker strip to the tire carcass.

The final operation of assembling a tire (the addition of a tread element) is accomplished upon the mechanism illustrated in Figure 4 of the drawings. This machine includes a base and drum mechanism similar to that discussed in connection with Figure 2. However, the stitcher roller 89 is replaced by a tread roller 139, shown in Figure 10. In addition, it includes an auxiliary stitcher mechanism 140, adapted to perform a preliminary stitching operation upon a tire tread. The auxiliary stitcher device includes a bracket 141 of U-shape, secured to the upper edge of the plate 29, that functions as a bearing for a transversely extending shaft 142, upon which are journalled parallel branches 143 and 144 of an arm 146 of U-shape. In order to facilitate manual operation of the arm 146, a handle 147 is secured to the intermediate portion 148 thereof. The branches 143 and 144 of the arm 146 form a support for a shaft 149 journalled therein intermediate their length. A yoke 151 is secured to the member 149, and is thereby suspended with its branches 152 extending downwardly to form bearings for a transversely extending tread stitcher roller 153, similar in contour to the roller 139. In order to maintain the arm 140 in substantially a perpendicular position, where it may conveniently be reached by the operator, a bracket 154 having an upstanding arm 156, is secured to the upper edge of the plate 29 at such position as to engage the rear edge of the branch 144.

In order to apply the tread element 160 to a tire carcass, one end of a strip of tread stock is placed upon that portion of the tire carcass which is disposed upon the upper portion of the drum 24. The arm 140 is then lowered to bring the stitcher roller 153 into contact with the upper surface of the tread stock. By operating the motor 16, the drums 23 and 24 are rotated until the required length of tread material is wound upon and stitched to the surface of the tire carcass 50. Excess material is trimmed away and the ends of the tread element are brought into abutting relation. Fluid is next admitted to the cylinder 65 to actuate the piston 67 downwardly and thus cause the pneumatically operated stitcher roller 93 to contact with the surface of the tread element. The latter roller applies a relatively strong pressure to the surface of the element and thus firmly stitches it to the outer surface of the tire carcass, thereby completing the assembly of a pneumatic tire band. Bands thus assembled may be removed upon operating the piston 38 to swing the drum 24 toward the drum 23.

In order to assemble a tire according to this invention, closed bands of fabric are placed upon the drums 23 and 24, while the drum 24 is swung into close proximity to the drum 23. Also, while the drums are in this relation with respect to each other, bead elements are placed upon the edge portions of the inner plies of fabric. The piston 38 is then operated to swing the drum 24 away from the drum 23, thus applying tension to the fabric bands and also to the beads disposed thereon. By operating the motor 16, the drums 23 and 24 are caused to rotate. At the same time, the edge portions of the fabric bands 50 are turned up about the beads by means of a manually operated tool. The relation of the various tire elements at this stage is shown in Figure 6. When the edge portions of the fabric have thus been turned up about the beads, the piston 38 is again operated to bring the drums 23 and 24 into closer relation with respect to each other, thus permitting the removal of the partially assembled tire band from the drums.

The band is next placed upon the mechanism disclosed in Figure 2, where strips of fabric 110 are withdrawn from the supply rollers 105 and 106 in order to form the outer plies of fabric of the tire carcass. These plies may be stitched together and also stitched to the surface of the inner plies and to the beads by means of the stitcher roller 89. The elements thus assembled are shown in cross-section in Figure 7. After the completion of this operation, the tire carcass under construction is removed from the drums in the same way it was removed from the drums employed in the first operation.

The carcass is next placed upon the drums of the mechanism disclosed in Figure 3, in order to permit the application of the chafing strips 119 and 122 and also of the breaker strip 129. After these elements have been applied and stitched to the tire carcass, the latter is removed and placed upon the machine disclosed in Figure 4, in order to permit the application of the tread element 160. When this operation is accomplished, the completely assembled tire band is removed from the machine and is ready to be shaped upon any convenient shaping mechanism. The condition of a tire carcass at the completion of the last two steps is shown in Figures 8 and 9, respectively.

From the preceding description, it will be apparent that this invention involves a relatively simple method whereby division of the various steps involved in the assembly of pneumatic tire bands among a relatively large number of operators is permitted. The number of different operations required by a single operator are thus greatly reduced, and increased efficiency results. Also, the equipment required for each machine employed in the process is materially simplified. The total amount of equipment required in a factory for the manufacture of pneumatic tires is thus materially reduced.

Although I have illustrated only one form which the invention may assume and have described in detail only a single application thereof, it will be apparent to those skilled in the art that the invention is not so limited, but that various minor modifications may be made therein without departing from the spirit of the invention or from the scope of the appended claim.

What I claim is:

A method of assembling pneumatic tire bands which comprises disposing inner plies of fabric about a plurality of rotatable drums by passing closed bands of fabric longitudinally over the ends of the drums, applying beads to the edges of the plies, turning said edges up about the beads, removing the partially assembled tire carcass thus formed, putting it upon a second set of drums, applying additional plies of fabric in the form of open bands to the surface of the carcass while the original contour thereof is maintained, removing the carcass from the second drums and applying it to other drums, and applying other tire elements.

In witness whereof, I have hereunto signed my name.

Signed at Akron, in the county of Summit and State of Ohio, this 26th day of April, 1928.

ROBERT W. SNYDER.